United States Patent [19]
Heintz et al.

[11] Patent Number: 5,687,757
[45] Date of Patent: Nov. 18, 1997

[54] SECURE LOCK AND SPILL PREVENTER FOR FLUID STORAGE FACILITY

[75] Inventors: Perry C. Heintz, P.O. Box 242, Erskine, Alberta, Canada, TOC 1GO; Kelly R. Thorkelson, Stettler, Canada

[73] Assignee: Perry C. Heintz, Erskine, Canada

[21] Appl. No.: 435,347

[22] Filed: May 4, 1995

[51] Int. Cl.⁶ ........................................ F16K 27/08
[52] U.S. Cl. .............................. 137/382; 137/377
[58] Field of Search ........................ 137/377, 382

[56] References Cited

U.S. PATENT DOCUMENTS

| | | |
|---|---|---|
| 1,657,283 | 1/1928 | Schilling . |
| 1,690,461 | 11/1928 | Sieben . |
| 4,538,434 | 9/1985 | Janzen, Sr. et al. . |
| 5,150,730 | 9/1992 | Campbell ........................ 137/377 |
| 5,188,294 | 2/1993 | Sealy et al. ..................... 137/382 |
| 5,195,554 | 3/1993 | Gaetano ........................... 137/377 |
| 5,349,992 | 9/1994 | Gallo et al. . |
| 5,361,931 | 11/1994 | Van Landingham . |

*Primary Examiner*—A. Michael Chambers
*Attorney, Agent, or Firm*—Chernoff, Vilhauer, McClung & Stenzel

[57] ABSTRACT

Apparatus guarding against vandalism and spillage of fluids from a bulk fluid storage facility is described. The apparatus includes a lockable enclosure mounted at the discharge end of the outlet pipe from a bulk fluid storage tank. The enclosure has a receptacle for collecting spilled fluids. A fluid shut-off valve is mounted in the enclosure. The enclosure has a lid which is mounted so that it can be properly closed only when the shut-off valve is fully closed. The receptacle catches any fluid which may drip out of the discharge end of the outlet pipe. The enclosure can be locked to prevent vandals from opening the shut-off valve. When it is closed, the enclosure protects fluid in the receptacle from rain and prevents animals from getting into the fluid in the receptacle.

15 Claims, 7 Drawing Sheets

1

SECURE LOCK AND SPILL PREVENTER FOR FLUID STORAGE FACILITY

FIELD OF THE INVENTION

This application relates to apparatus for storing bulk fluids and, more particularly, to apparatus for guarding against vandalism and spillage of fluids by lockably enclosing the discharge end of the outlet pipe from a bulk fluid storage tank.

BACKGROUND OF THE INVENTION

It is common to use trucks to move fluids into or out of large fluid storage tanks. For example, off storage tanks may be used to temporarily store crude oil in an oil field. Such oil storage tanks are often located in remote parts of the oil field to which it is not economically viable to run a pipeline. Crude oil is pumped from the ground into the tank. When the tank is sufficiently full a tanker truck transports the crude oil from the tank to a central location for processing or further shipment.

Large fluid storage tanks can be hazards to the environment. The tanks are susceptible to vandalism. This is particularly true for tanks which are in remote locations. It happens that vandals open the outlet valves on such tanks thereby allowing the contents of the tank to spill onto the ground. This can be very damaging to the environment as the tank may contain crude oil or some other dangerous substance.

Another problem with large fluid storage tanks is that the contents of such tanks can escape by accident. The connection between a tank's outlet pipe and the hose which conveys the contents of the tank to a truck often leaks during transfer. Further, a quantity of fluid usually remains in the end of the outlet pipe and drips out after the tank has been disconnected from a truck. Oil companies deal with this latter problem by putting an open barrel below the end of the outlet pipe to catch any fluid that drips out. Unfortunately such barrels soon fill with rainwater and become useless for catching drips. Further, the barrels often become filled with debris such as garbage, dead birds and small dead animals which become trapped in the oil in the barrels. Truckers do not clean the barrels out regularly or at all because this debris can clog or ruin the pumps that the truckers would use to pump the collected oil drippings out of the barrels.

Oil companies spend thousands of dollars every year cleaning up oil which has been accidentally or deliberately spilled from oil storage tanks. Even so, significant amounts of oil are not cleaned up well enough to protect the environment.

Van Landingham, U.S. Pat. No. 5,361,931 discloses a lockable receptacle that can be attached to the outlet pipe of an oil storage tank. The lower portion of the receptacle forms a compartment for collecting drips which may come out of the end of the pipe from the oil storage tank. Van Landingham's system does solve some of the problems which are caused when an open barrel is used to catch drips. Van Landingham does not provide an effective means for locking a fluid shut-off valve or address the problem of vandalism and does not provide a practical means for removing collected fluids from his receptacle.

Some previous devices have been developed for locking the outlet valves on oil storage tanks to prevent vandalism. These devices typically include a box which can be locked in place around the valve but do not include any provision for catching drips of fluid or preventing the spillage of fluid. U.S. Pat. Nos. 4,538,434; and 1,690,461 show typical valve locking systems.

SUMMARY OF THE INVENTION

This invention addresses the problems of securing and preventing the spillage of fluid from the outlet of a fluid storage tank by providing a fluid storage system which comprises: a tank for storing fluid; an outlet pipe extending from the tank to an inlet of a valve; a box enclosing the valve; and a coupler in fluid communication with an outlet of the valve. The box comprises a fluid-impermeable lower receptacle portion and a lid. The lid has an open position and a closed position. The outlet pipe extends through a wall of the box to the valve inlet. The coupler is located above the receptacle portion of the box.

In a preferred embodiment of the invention the valve comprises a housing and a movable member operatively associated with the housing for opening and closing the valve. The movable member has a first position wherein the valve is closed and the movable member is entirely inside the box. The movable member also has a second position wherein the valve is not closed and the movable member obstructs the lid from being closed.

In a further preferred embodiment of the invention, a tube is provided for withdrawing fluid from the receptacle portion of the box. The tube has a first end in fluid communication with the coupler and a second end in the receptacle portion. A valve is preferably provided in the tube.

BRIEF DESCRIPTION OF THE DRAWINGS

Preferred embodiments of the invention will now be described with reference to the attached drawings which should not be construed as restricting the spirit or scope of the invention in any way. In the drawings.

DETAILED DESCRIPTION OF THE INVENTION

Figure 1:
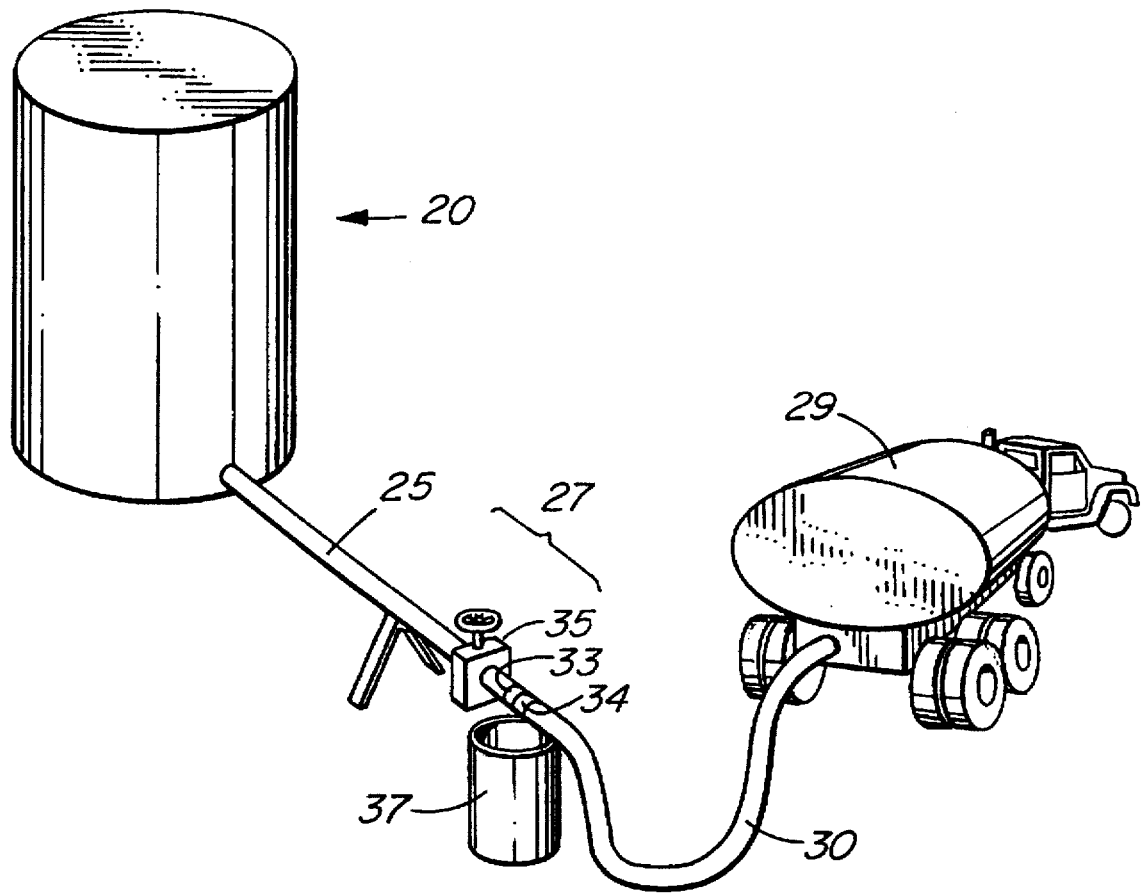
FIG. 1 is a schematic perspective view of a truck drawing fluid from a typical fluid storage tank.

FIG. 1 shows a typical fluid storage tank 20. An outlet pipe 25, which is typically on the order of 10 centimeters in diameter, extends from tank 20 to a connection point 27. Connection point 27 is accessible to a road so that a truck 29 can receive fluid from connection point 27 through a flexible hose 30 carried on truck 29. Hose 30 connects to a coupling 33 at the end of outlet pipe 25 by means of a mating coupling 34 at the end of hose 30. A valve 35 is located in pipe 25 near coupling 33. Valve 35 allows the flow of fluid from pipe 25 to be shut off. Typically an open barrel 37 is placed under coupling 33 to catch drips that may occur during and after the transfer of fluid from tank 20 to truck 29.

A problem with the prior art arrangement shown in FIG. 1 is that vandals can empty the contents of tank 20 through pipe 25 by opening valve 35. Another problem is that barrel 37 tends to fill with rainwater until any oil which does drip into it from coupling 33 simply overflows onto the ground.

Figure 2:
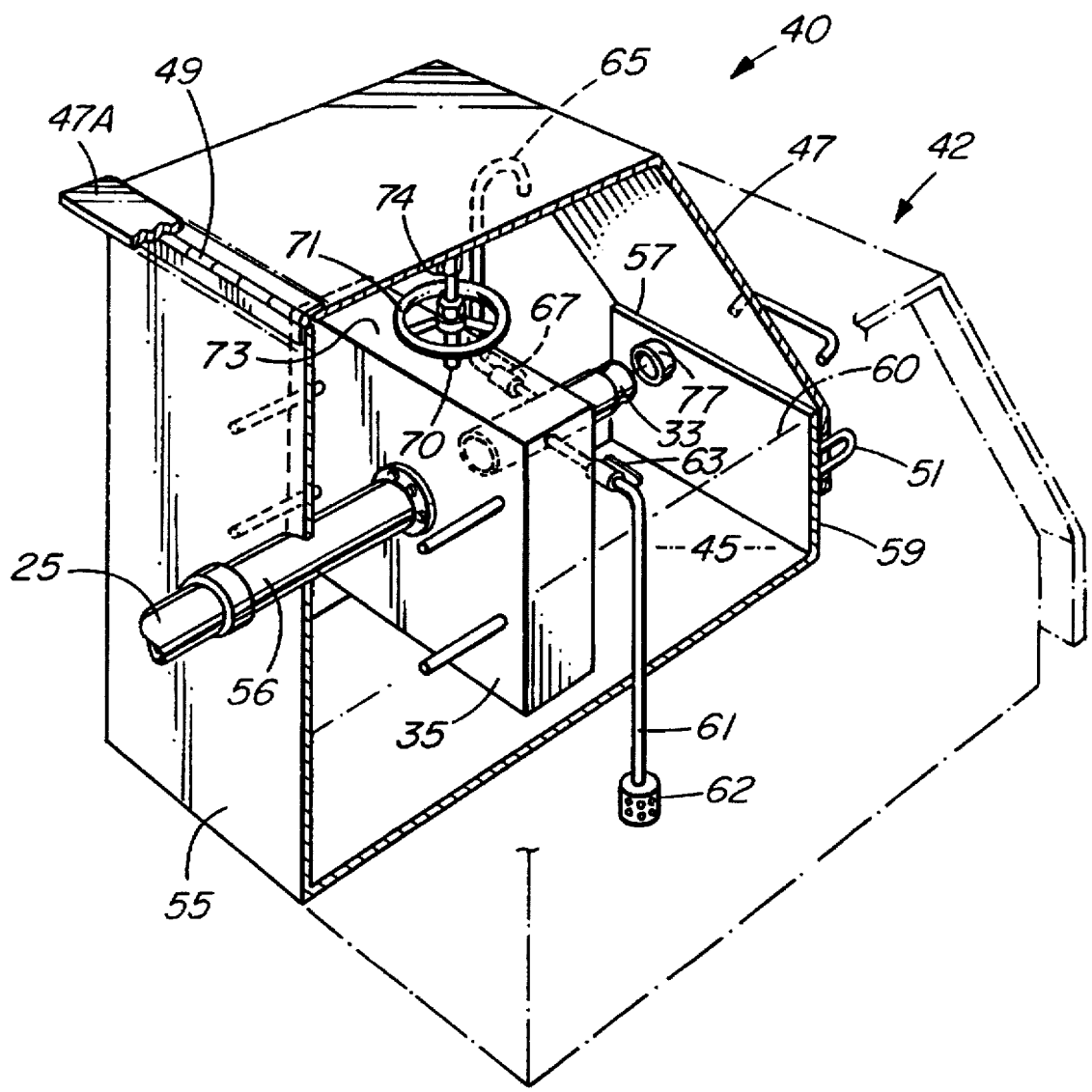
FIG. 2 is a cut-away perspective view of apparatus according to a first embodiment of the invention.
Figure 3:
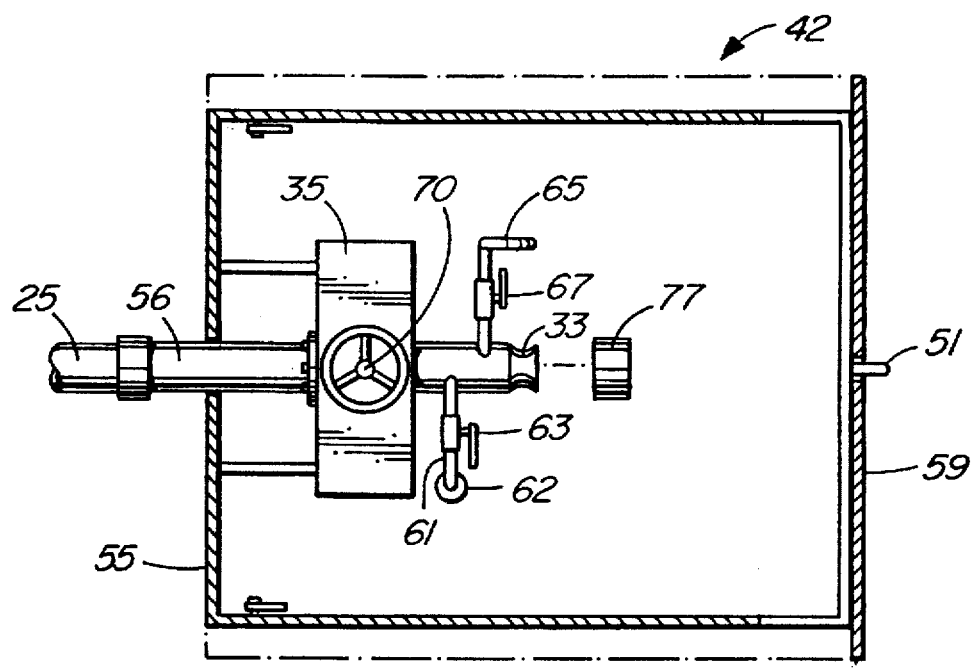
FIG. 3 is a partially cut away top plan view thereof.

FIGS. 2 and 3 show apparatus 40 according to the invention which avoids some of the problems of the prior art. Apparatus 40 comprises a box 42 which attaches at the end of pipe 25. Box 42 is preferably made of metal but may also be made of other durable weather resistant materials which are resistant to attack by the fluid being stored.

Box 42 has a fluid-tight lower receptacle region 45 and a lid 47. Lid 47 is mounted to receptacle region 45 with a weather tight hinge 49 so that box 42 can be opened. A hasp 51 is provided so that box 42 may be locked shut. Other conventional locking means may be provided to lock lid 47 closed without departing from the scope of the invention. When lid 47 is closed and locked, receptacle region 45 is protected from the weather and the inside of box 42 is inaccessible to vandals.

Pipe 25 enters box 42 through rear wall 55 and connects to the inlet of a valve 35 inside box 42. Valve 35 is preferably a gate valve sized for the application and the fluids being stored. Valve 35 may also be another type of valve suited to the application. For example, where pipe 25 is the 3 inch diameter outlet pipe from a crude oil storage tank then valve 35 may be a 3 inch model T1590 gate valve available from Newman Hattersly of Edmonton, Alberta, Canada. Valve 35 may also be, for example, a model 400 PSI MAS ball valve available from M. A. Stewart & Sons of Surrey, British Columbia, Canada.

Preferably, valve 35 and box 42 are attached to each other and to pipe 25. A convenient way to accomplish this is to provide a short stub of pipe 56 which has one end connected to the inlet of valve 35 and a threaded end (or a flanged end) projecting outwardly from wall 55. Stub 56 is preferably welded in place in an aperture in wall 55. The threaded or flanged end is connected to a suitable fitting at the discharge end of pipe 25. In this way, box 42 can be supplied together with valve 35 as a unit and securely assembled to the end of an outlet pipe 25 with conventional assembly techniques. Where stub 56 has a male threaded end then box 42 and stub 56 may be simply "spun on" to a mating female threaded coupling the end of pipe 25.

In some cases it is not practical to mount apparatus to pipe 25 as described above. For example, in some installations several valves 35 for several oil storage tanks are mounted very closely together at a single connection point 27. In such installations it can be impractical to provide a separate box 42 for each valve 35. In such cases it is useful to provide a single free-standing box 42 which encloses several valves 35. Pipes 25 from several oil storage tanks can enter the box 42 through apertures in its rear wall. Valves 35 are then affixed to the ends of pipes 25 inside box 42. After valves 35 have been affixed to pipes 25 then box 42 cannot be removed. While it is generally not preferable to do so, a free-standing box 42 may also be used in systems with a single pipe 25 and a single valve 35.

A coupling 33 is mounted inside box 42 in fluid communication with the outlet of valve 35. Preferably coupling 33 is mounted generally horizontally and above the upper edge 57 of forward wall 59 of receptacle region 45. Fluid may be withdrawn from a storage tank connected to pipe 25 by attaching a hose (not shown) equipped with a mating coupling to coupling 33 and opening valve 35. Coupling 33 may be a screw type coupling but is preferably a quick-release "cam lock" coupling such as a model 300A coupling available from Bayco Industries of Winnipeg, Manitoba, Canada. Any drips of fluid which are released from valve 35 or coupling 33 during or after the fluid transfer fall into and are caught in receptacle region 45.

Receptacle region 45 is large enough to catch a significant quantity of spilled fluid. While the particular dimensions of box 42 may obviously be varied without departing from the scope of the invention, in a typical single-valve application, receptacle region 45 may have horizontal dimensions of approximately 40 cm by 50 cm and front wall 59 typically has a height of approximately 15 cm so that receptacle region 45 typically has a volume of about 30 liters. Receptacle region 45 may be much larger, particularly where box 42 is free-standing as described below.

In the illustrated embodiment, front wall 59 is shorter than the other walls of receptacle region 45. Therefore, front wall 59 defines the maximum fluid level 60 which can be contained in receptacle region 45. Because receptacle region 45 is normally protected by lid 47 the fluid caught in receptacle region 45 remains clean and is not contaminated with rainwater. Lid 47 and the other walls and floor of box 42 prevent birds or other small animals from contacting any fluid in receptacle region 45. As noted above, coupling 33 is above maximum fluid level 60 so that fluid collected in receptacle region 45 cannot interfere with coupling 33.

A pipe 61 which is connected to the interior of coupling 33 through a valve 63 is preferably provided to draw off any fluid that collects in receptacle region 45 before receptacle region 45 fills to near maximum fluid level 60. Pipe 61 preferably extends essentially to the bottom of receptacle region 45. Fluid which has collected in region 45 can be drawn off by closing valve 35 and opening valve 63 while applying suction to coupling 33 with a pump (not shown) on the truck into which the fluid is being transferred. Pipe 61 may be equipped with a strainer 62 at its lower end to prevent any foreign objects which somehow get into receptacle region 45 from being sucked into pipe 61.

A second short pipe 65 may also be provided to allow sampling of the fluid being transferred. Pipe 65 is connected to coupling 33 through a valve 67. If valve 67 is opened while the fluid inside coupling 33 is at a pressure higher than atmospheric pressure, which will usually be the case due to the static pressure within oil storage tank 20, then a small stream of the fluid will flow out of pipe 65. Excess fluid which is allowed to exit through pipe 65 simply collects in region 45 from where it can be drawn off as described above.

Figure 4:
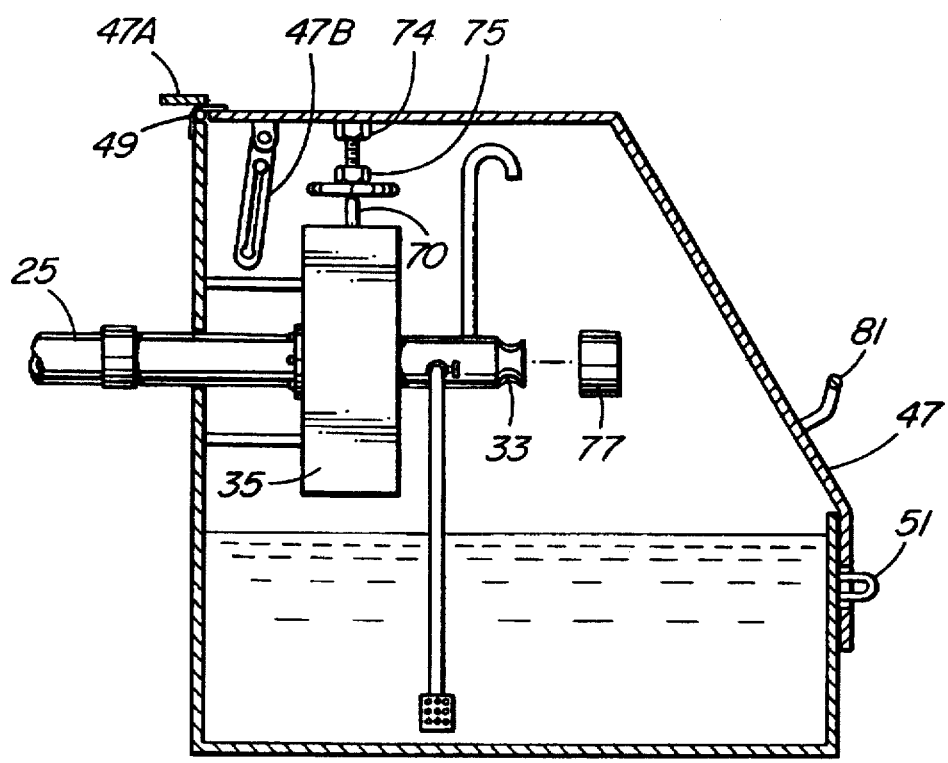
FIG. 4 is a schematic side elevation thereof with the valve closed.
Figure 5:
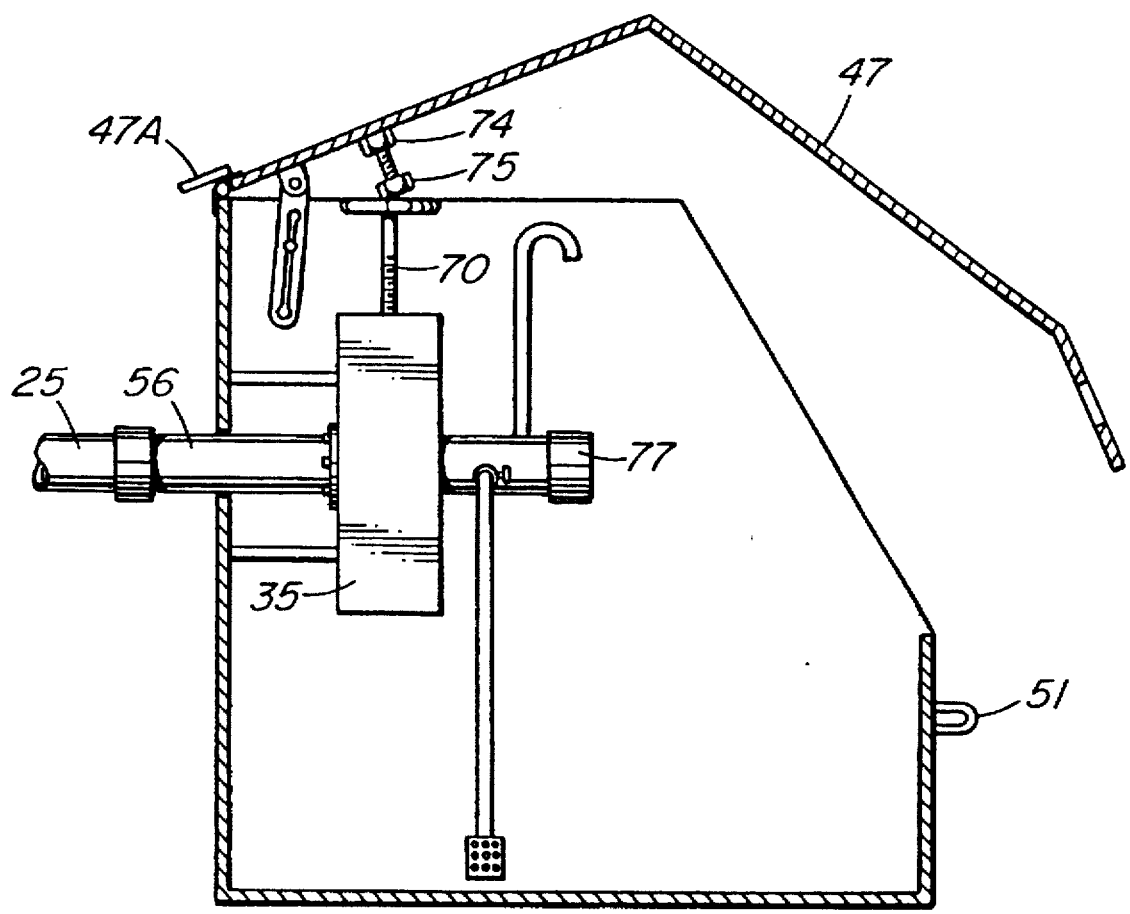
FIG. 5 is a schematic side elevation thereof with the valve open.

Valve 35 is moved between its open and closed positions by means of a rod 70 which is threaded into the housing 73 of valve 35. Valve 35 is opened by turning rod 70 with handle 71. As this happens, rod 70 and handle 71 project farther out from housing 73. Valve 35 is closed by threading rod 70 as far into housing 73 as it will go. The relationship between rod 70 and lid 47 provides a fail-safe feature. As shown in FIGS. 4 and 5, Valve 35 is located inside box 42 so that lid 47 can be fully closed only if rod 70 is in its closed position. If rod 70 is not in its fully closed position then, as shown in FIG. 5, rod 70 projects far enough upward from valve housing 73 to prevent lid 47 from achieving its fully closed position, which is indicated by a broken line.

An adjustable spacer 74 may be provided to adjust the clearance between the end of rod 70 and lid 47 so that lid 47 can be closed and locked only if valve 35 is completely closed. Adjustable spacer 74 may be located on lid 47, as shown in FIG. 4, or on rod 70. The adjustable space shown in FIG. 4 comprises a bolt 75 threaded into a nut attached to lid 47. The clearance which exists when lid 47 is closed between the head of bolt 75 and the end of rod 70 can be adjusted by turning bolt 75.

Preferably a sealing cap 77 is provided to positively close coupling 33 when fluid is not being withdrawn through coupling 33. Sealing cap 77 may be, for example, a model 33DC-A.L. cap available from Bayco Industries of Winnipeg, Manitoba, Canada. Sealing cap 77 provides an added level of security. As sealing cap 77 is inside box 42 it is protected from vandals.

It will be obvious to persons skilled in the art that this fail-safe mode of operation can be provided using valves which differ in construction details from the valves shown herein. What is necessary is that the valve is operated by moving a member and the member projects into a position which obstructs the closure of lid 47 when the valve is not fully closed and, when the valve is frilly closed, the member is in a position where it does not interfere with locking or locking lid 47.

Figure 6:
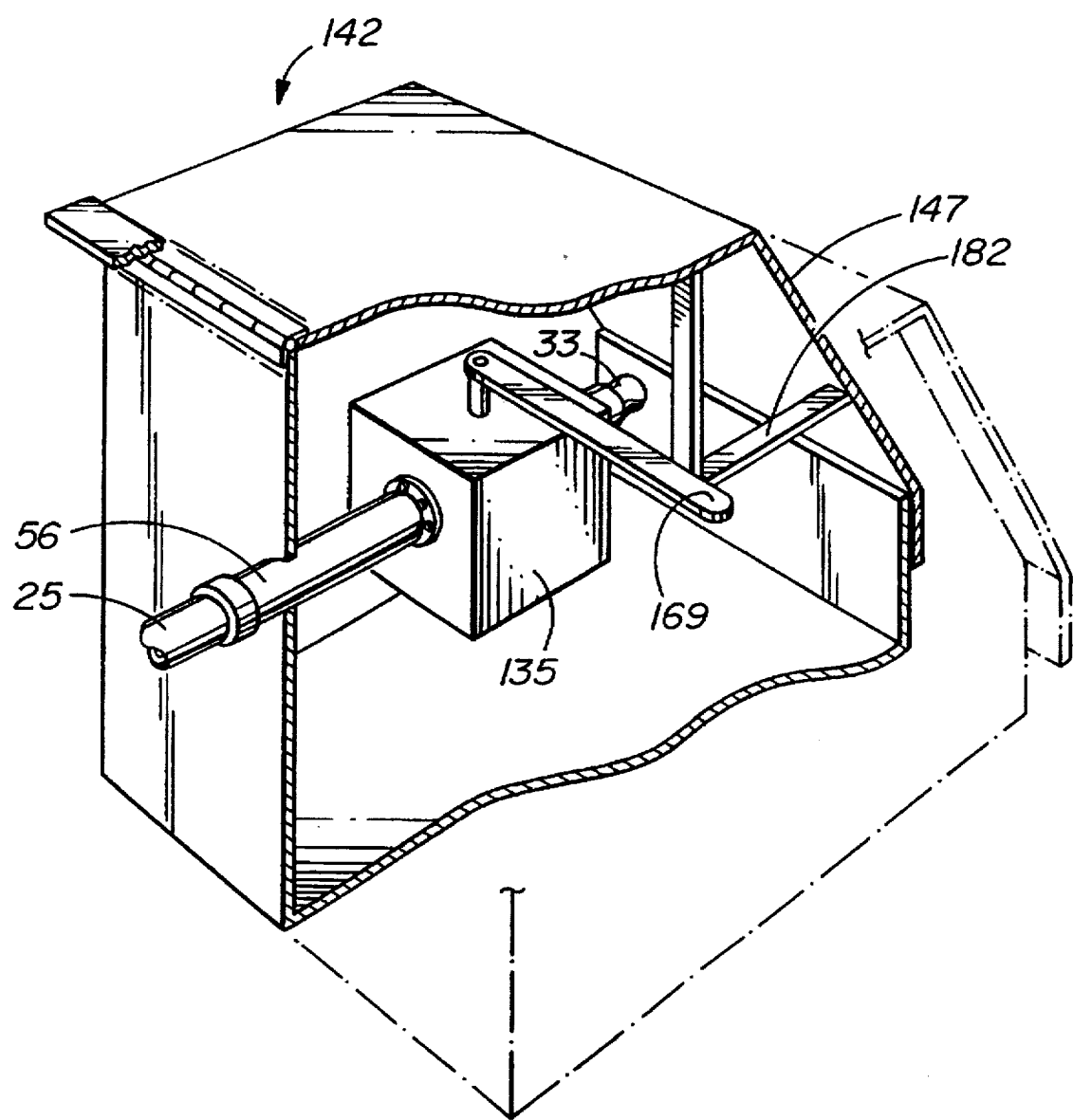
FIG. 6 is a perspective view of an alternative embodiment of the invention employing a ball valve.
Figure 7:
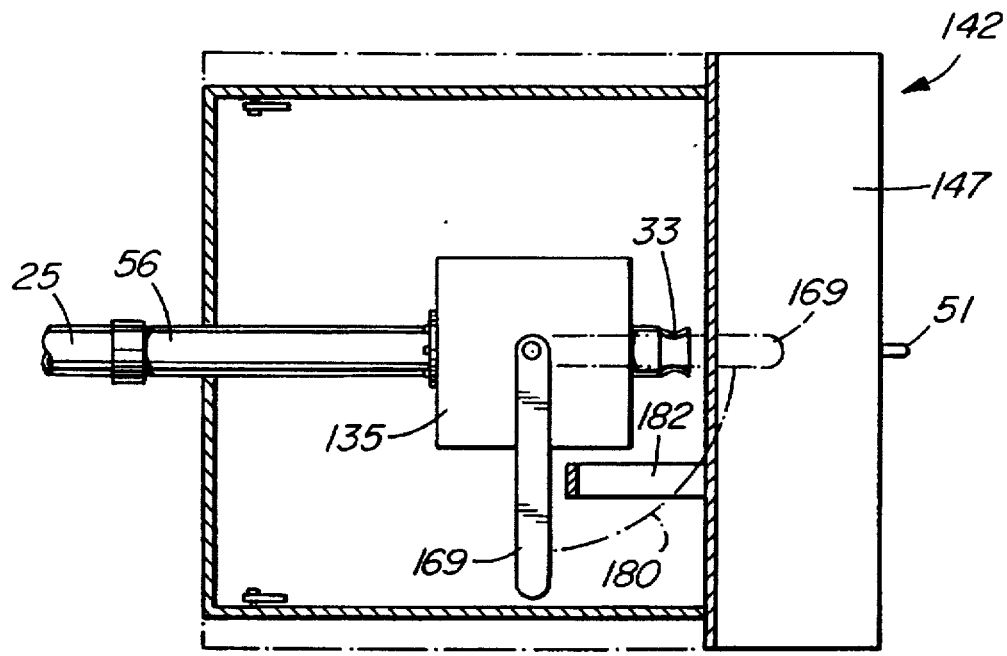
FIG. 7 is a top plan view of the embodiment shown in FIG. 6.
Figure 8:
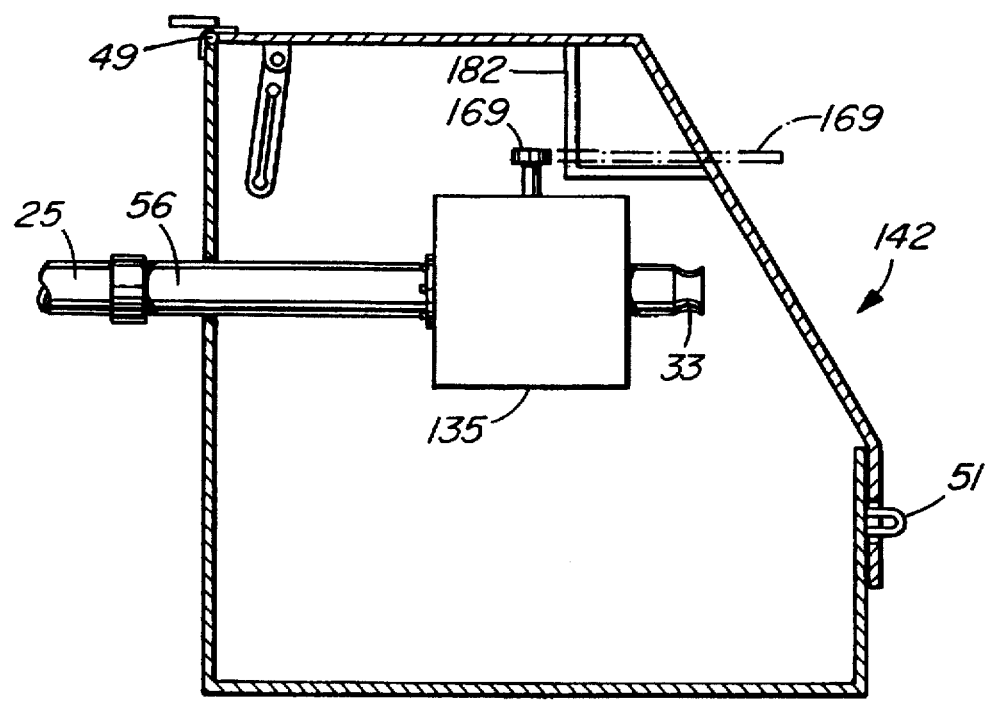
FIG. 8 is a partially cut away side elevation of the embodiment shown in FIG. 6.

For example, FIGS. 6 through 8 show an alternative embodiment of the invention which uses a ball valve 135 to control the flow of fluid from pipe 25. Ball valve 135 is operated by a handle 169 which can be moved between an open position and a closed position along an arc 180 which is illustrated by a dashed line. The open position of valve 135 is shown in FIG. 7 in dotted outline. When handle 169 is in its closed position then, lid 147 of box 142 can be closed. A member 182 projects downwardly from lid 147. When lid 147 is closed then member 182 projects downwardly to a level lower than the path of handle 169. If handle 169 is in its open position, or in a partially open position somewhere along arc 180, then lid 147 cannot be fully closed either because, before lid 147 is fully closed, the end of handle 169 hits lid 147, as shown in FIG. 7, or because member 182 hits the top of handle 169. Ball valves are sometimes supplied with fairly short handles. Where valve 135 is a ball valve then it may be necessary to replace the handle supplied with the ball valve with a handle 169 which is long enough to prevent the closure of lid 149, as described above, when the valve 135 is not fully closed.

Figure 9:
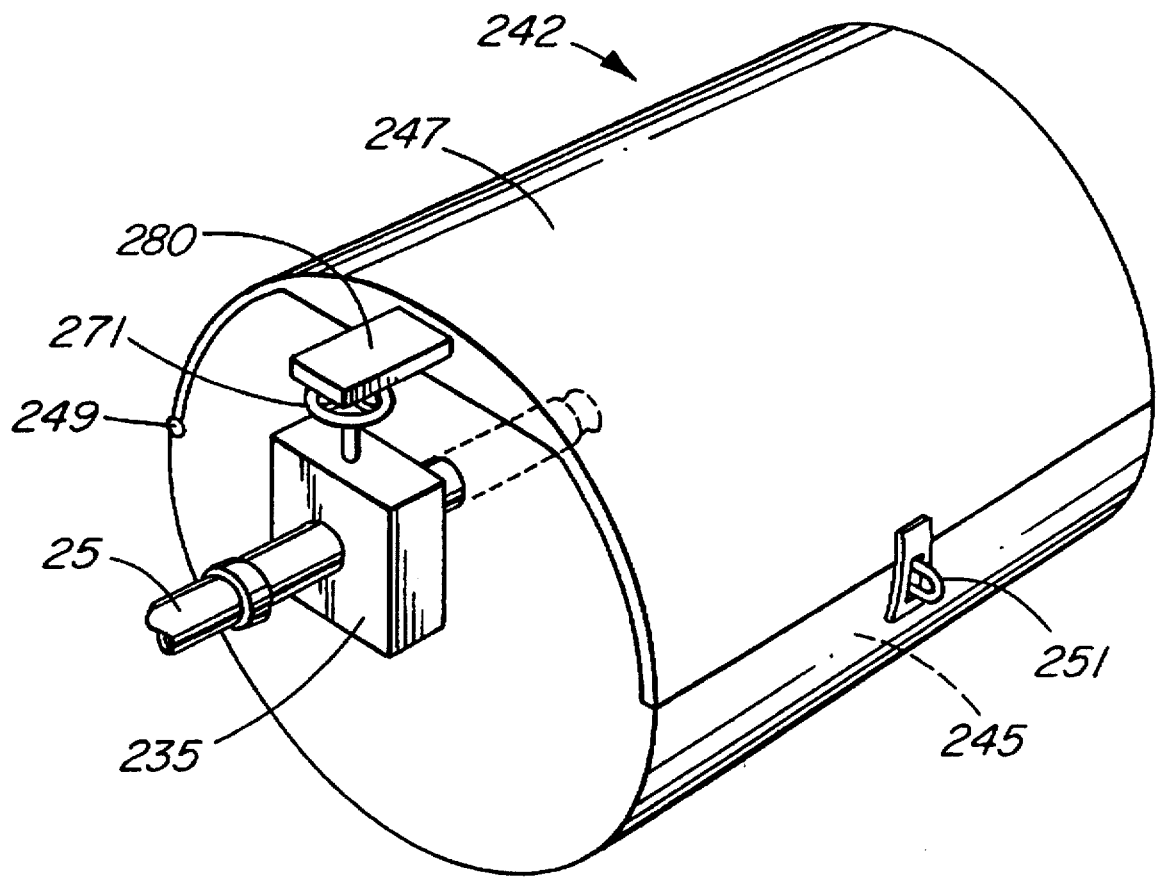
FIG. 9 is a schematic view of apparatus according to an alternative embodiment of the invention.

FIG. 9 shows an alternative embodiment of the invention in which a valve 235 is mounted outside of a box 242. Box 242 has a lower receptacle portion 245 and a lid 247 which is mounted to receptacle 245 by hinge 249. Box 242 may be conveniently s made from a section of pipe of suitable diameter which has been cut in half longitudinally. Box 242 may be locked shut by passing a padlock through hasp 251. Box 242 cannot be fully closed unless valve 235 is fully closed. When valve 235 is open, handle 271 of valve 235 extends to a position which obstructs the path of a member 280 which is attached to lid 247.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A fluid storage system comprising:
   (a) a tank for storing fluid;
   (b) a valve having a fluid inlet and a fluid outlet;
   (c) a box enclosing said valve, said box comprising a fluid-impermeable lower receptacle portion and a lid mounted to said lower receptacle portion, said lid having an open position and a closed position;
   (d) an outlet pipe extending from said tank, penetrating a wall of said box and connecting to said fluid inlet of said valve; and
   (e) a coupler in said box, said coupler in fluid communication with said fluid outlet of said valve and above said lower receptacle portion;
   wherein said valve comprises a valve housing and a movable member for opening and closing said valve operatively associated with said valve housing, said movable member having a first position wherein said valve is closed and said movable member is entirely inside said box and a second position wherein said valve is not closed and said movable member obstructs said lid from being closed.

2. The fluid storage system of claim 1 further comprising locking means for locking said lid in said closed position.

3. The fluid storage system of claim 1 further comprising a tube having a first end in fluid communication with said coupler and a second end in said receptacle portion.

4. The fluid storage system of claim 3 further comprising a valve in said tube.

5. The fluid storage system of claim 4 further comprising: a sampling tube having a first end in fluid communication with said coupler and a second free end; and a shut off valve in said sampling tube.

6. The fluid storage system of claim 1 wherein said valve housing is fixed with respect to said receptacle portion, said movable member comprises a rod in screwing engagement with said valve housing and said lid is hinged to said fluid-impermeable lower receptacle portion of said box.

7. The fluid storage system of claim 6 further comprising a spacer having an adjustable thickness between said lid and said rod.

8. The fluid storage system of claim 7 wherein said spacer is on said rod.

9. The fluid storage system of claim 7 wherein said spacer is on said lid.

10. The fluid storage system of claim 1 further comprising a detachable sealing cap on said coupler.

11. A fluid spill preventer for mounting to the discharge end of all outlet pipe from a fluid storage facility, said fluid spill preventer comprising:
   (a) a fluid impermeable receptacle comprising walls extending upwardly from a floor to a maximum fluid level;
   (b) a lid hingeably mounted to said receptacle, said lid having an open position and a closed position;
   (c) a valve connected to said receptacle, said valve having a fluid inlet, a fluid outlet, and an operating member, said operating member movable between a first position wherein said valve is shut and a second position wherein said valve is open;
   (d) a fitting for connecting said fluid inlet to a discharge end of an outlet pipe from a fluid storage facility;
   (e) a connector coupled to said fluid outlet, said connector having an end located higher than said maximum fluid level above said receptacle; wherein said operating member obstructs placing said lid in said closed position unless said operating member is in said first position.

12. A fluid storage system comprising:
   (a) a tank for storing fluid;
   (b) an outlet pipe extending from said tank to an inlet of a valve, said valve having an inlet, an outlet, and a movable operating member, said operating member movable between a first position wherein said valve is shut and a second position wherein said valve is open;

(c) a fluid impermeable receptacle having walls extending upwardly from a floor to a maximum fluid level mounted to said valve;

(d) a connector coupled to said valve outlet, said connector having an end located above said receptacle and above said maximum fluid level;

(e) a lid hingeably mounted to said receptacle, said lid having an open position wherein said connector is accessible and a closed position wherein said connector is enclosed and said receptacle is covered;

(f) a lock for securing said lid in said closed position; and (g) a lid member on said lid, said lid member following a path when said lid is moved from said open position to said closed position;

wherein, while it is in said second position, said operating member obstructs said path of said lid member and blocks movement of said lid to said closed position.

13. The fluid spill preventer of claim 11 wherein said valve is completely enclosed when said lid is in said closed position.

14. The fluid spill preventer of claim 11 wherein operating member comprises a rod in screwing engagement with a housing of said valve.

15. The fluid spill preventer of claim 11 wherein operating member comprises a swinging handle.

* * * * *